(12) United States Patent
Costigan et al.

(10) Patent No.: US 7,721,487 B2
(45) Date of Patent: May 25, 2010

(54) GLASS ATTACHMENT FOR MOVABLE VEHICLE WINDOW

(75) Inventors: Terrence P. Costigan, Fenton, MI (US); Favad Shah, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 434 days.

(21) Appl. No.: 11/836,863

(22) Filed: Aug. 10, 2007

(65) Prior Publication Data

US 2009/0038227 A1    Feb. 12, 2009

(51) Int. Cl.
*B60J 1/16* (2006.01)
(52) U.S. Cl. .............................. 49/375; 49/374; 49/506
(58) Field of Classification Search ................... 49/348, 49/349, 352, 502, 374, 375, 506
See application file for complete search history.

(56) References Cited

U.S. PATENT DOCUMENTS

| | | | | |
|---|---|---|---|---|
| 6,205,711 B1 * | 3/2001 | Klippert | ...................... | 49/375 |
| 6,233,873 B1 * | 5/2001 | Lawrie et al. | ................. | 49/375 |
| 6,418,668 B1 * | 7/2002 | Arquevaux | ................... | 49/352 |
| 6,519,898 B2 * | 2/2003 | Tatsumi et al. | ................ | 49/375 |
| 6,557,302 B1 * | 5/2003 | Kaps | ............................ | 49/375 |
| 6,588,152 B2 * | 7/2003 | Cabbane | ...................... | 49/375 |
| 6,854,213 B2 * | 2/2005 | Galliani | ....................... | 49/375 |
| 7,409,797 B2 * | 8/2008 | Pound et al. | .................. | 49/375 |
| 7,430,831 B2 * | 10/2008 | Castellon | ..................... | 49/375 |
| 2003/0066244 A1 * | 4/2003 | Staser et al. | ................. | 49/375 |
| 2007/0006533 A1 * | 1/2007 | Dedrich et al. | ................ | 49/375 |

FOREIGN PATENT DOCUMENTS

| | | |
|---|---|---|
| DE | 8315959.2 U1 | 11/1983 |
| DE | 4420008 C1 | 5/1995 |
| DE | 19653046 A1 | 6/1998 |

* cited by examiner

*Primary Examiner*—Jerry Redman

(57) ABSTRACT

The present invention concerns a glass attachment and method of assembly for a movable vehicle window, particularly in a vehicle door. A pair of glass clips are attached to a window glass, and a pair of carriers are mounted and retained in a door by cable sets. A snap-in installation is performed by sliding camming guide shoulders on the carriers into channels formed by cam engagement flanges on the glass clips. As the camming action takes place, the carriers are lifted into use positions and catches on the glass clips engage catch openings on the carriers to secure the components together. Grooves in the carriers direct the cable sets, the ends of which are retained in the carriers by ferrules and cable take-up springs.

15 Claims, 3 Drawing Sheets

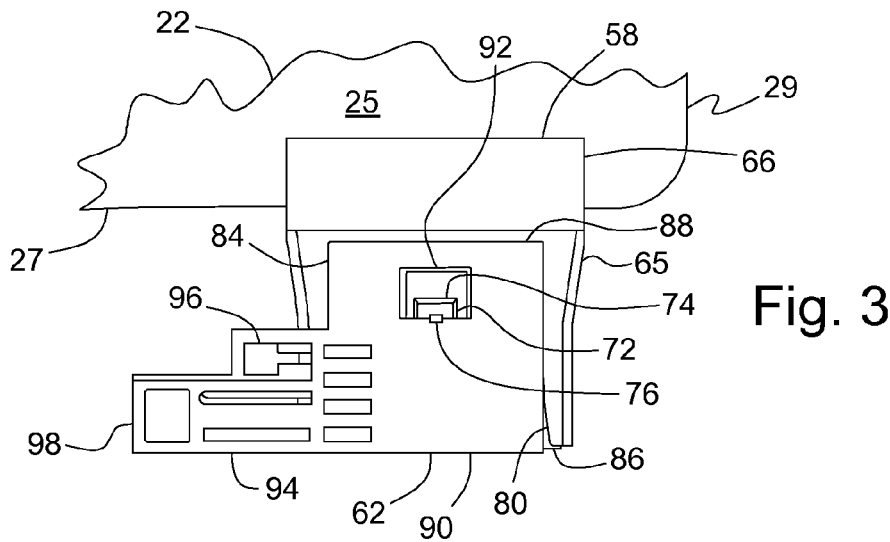
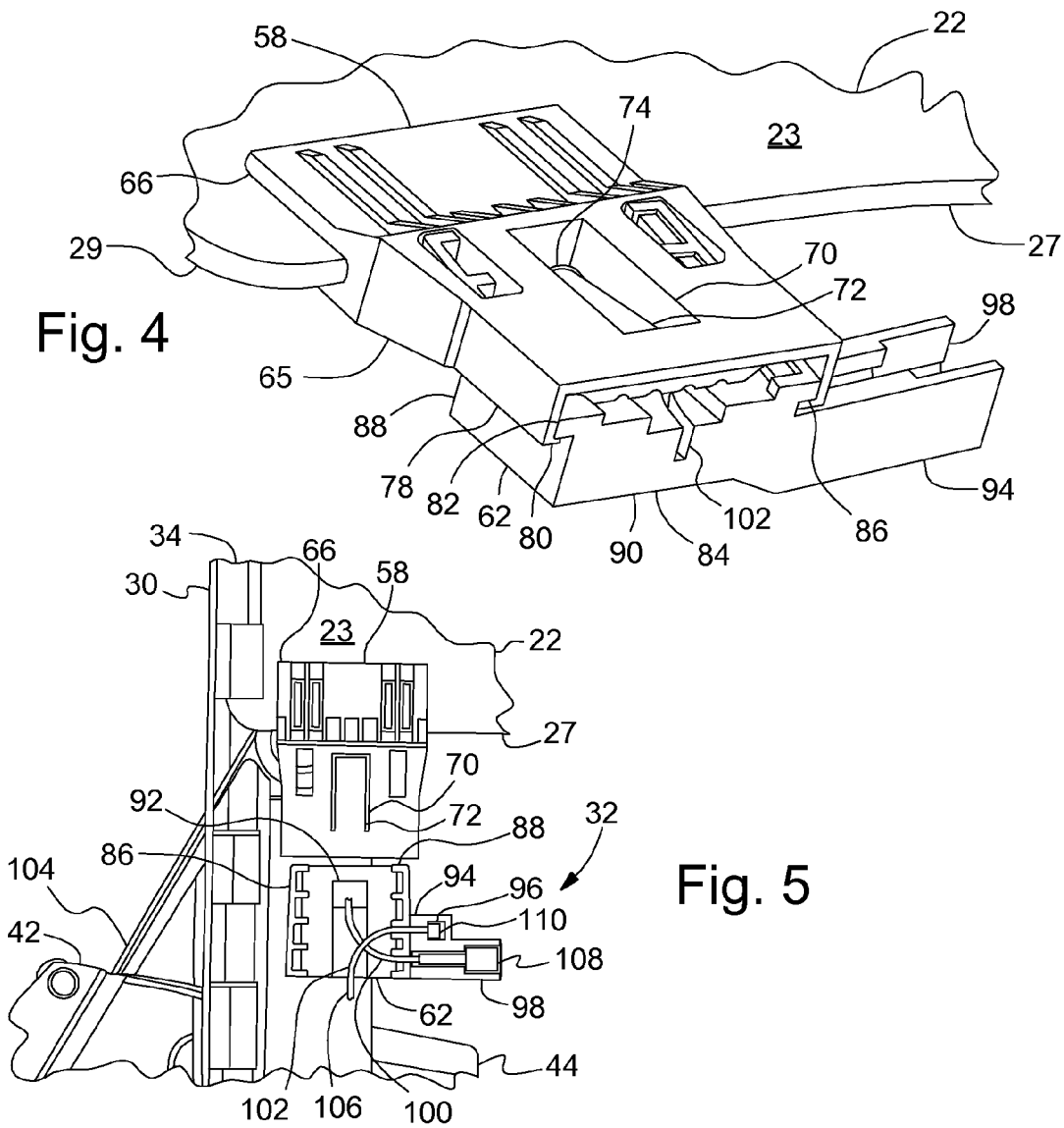

GLASS ATTACHMENT FOR MOVABLE VEHICLE WINDOW

BACKGROUND OF INVENTION

The present invention relates generally to vehicle doors and more particularly to the glass attachment for a movable window in a vehicle door.

Automotive vehicles typically include movable window glass in some or all of the vehicle side windows. For vehicle doors with movable window glass, the interiors of the doors include two separate assemblies. A first assembly, a glass run channel assembly, is mounted adjacent to the front and rear edges of the door. The run channel assembly directs the window glass in the fore-aft and inboard-outboard directions. A second assembly, a window regulator assembly, is spaced from the channel assembly more toward the middle of the door. The window regulator assembly is used to move the window glass up and down. The window regulator assembly typically includes a pair of guide rails, upon which sliders are mounted and guided. Typically, these two assemblies can be installed separately, with the window glass thereafter slid into the run channel assemblies and secured to the sliders in some way.

The window glass has been secured to the sliders in various ways, including mounting a regulator carrier plate to slide along the guide rails and bolting this plate to clips bonded on the window glass. Another attachment method includes using a clamping mechanism with an elastomeric insulator that is squeezed against the window glass, with the clamping mechanism being attached to the window regulator. Still others have employed a combination slider and carrier with a screw or bolt driven into a plastic clip that is snapped into a hole in the glass. All of these approaches generally have drawbacks in that they require more assembly time and/or cost more than is desirable.

A convenient way to assemble a window glass to a window regulator assembly may be particularly desirable for vehicle doors having movable window glass where the glass run channel assembly and the window regulator assembly are combined into a single assembly. Some have proposed combining the glass run channels and the window regulator assembly into one subassembly. However, the proposed solutions, while combining these components, tend to make installation of the window glass and connection to the window regulator more difficult. Consequently, for these types of configurations, while they have some advantages over conventional separate assemblies, they also have the potential to make assembling the window glass into this assembly more cumbersome and difficult—thus negating some of the advantage in combining the assemblies in the first place.

SUMMARY OF INVENTION

An embodiment contemplates a glass clip and carrier assembly for use in supporting a movable window glass in a vehicle door. The assembly may comprise a glass clip and a carrier. The glass clip may include a glass support flange engageable with the window glass, a clip body extending from the glass support flange, and a pair of cam engagement arms extending from the clip body, each of the cam engagement arms including a cam engagement flange extending therefrom to define a channel. The carrier may include a carrier body operatively engageable with a first cable set, and a pair of camming guide shoulders extending from the carrier body and slidably received in the channel, the camming guide shoulders extending farther from the carrier body at a first end adjacent to the glass support flanges and tapering toward the carrier body as the camming guide shoulders extend away from the first end, whereby the carrier body is pulled closer to the clip body as the camming guide shoulders are slid further into the channel.

An embodiment contemplates a window glass support assembly for use in supporting a movable window glass in a vehicle door. The assembly may comprise a glass clip, a carrier, a first cable set and a second cable set. The glass clip may include a glass support flange engageable with the window glass, a clip body extending from the glass support flange, and a pair of engagement arms extending from the clip body, each of the engagement arms including an engagement flange extending therefrom to define a channel. The carrier may include a carrier body having a pair of guide shoulders extending from the carrier body and slidably received in the channel, a first cable groove recessed in the carrier body and including a first end extending in a generally horizontal direction and a second end extending in a generally vertical direction, and a second cable groove recessed in the carrier body and including a first end and a second end. The first cable set may be mounted in the first cable groove and supporting the carrier, and the second cable set may be mounted in the second cable groove and supporting the carrier.

An embodiment contemplates a method of assembling a movable window glass into a vehicle door comprising the steps of: affixing a glass clip under a bottom edge of the window glass; supporting a carrier in a location in the vehicle door by securing the carrier to a first cable set and a second cable set; sliding the glass clip and the window glass into the vehicle door; sliding a first end of a pair of camming guide shoulders of the carrier into a channel in the glass clip, with the first end of the camming guide shoulders extending a first distance from a carrier body and tapering toward a second end that is a second distance from the carrier body, the second distance being less than the first distance; sliding the camming guide shoulders into the channel, thereby camming the carrier body closer to a clip body against a bias of the first cable set and the second cable set; and securing the glass clip to the carrier.

An advantage of an embodiment is the ability to attach a floating carrier to a glass clip, secured to the window glass prior to installation, during glass installation with a snap-in type of connection. This may be particularly useful in vehicle door applications where glass run channels and window regulators have been integrated into a single assembly.

An advantage of an embodiment is reduced assembly time, reduced cost, and potential for reduced material costs with a relatively simple and quick snap-in place installation, versus conventional attachment methods and assemblies.

BRIEF DESCRIPTION OF DRAWINGS

FIG. 3 is a side elevation view looking outboard at a portion of the window glass and a forward glass clip and forward carrier.

FIG. 4 is a perspective view of a portion of the window glass, forward glass clip and forward carrier.

FIG. 5 is a partially schematic, side elevation view looking inboard at a portion of the window glass, forward glass clip and forward carrier, prior to assembly of the glass clip to the carrier, and a portion of a forward integrated channel/regulator.

DETAILED DESCRIPTION

Figure 1:
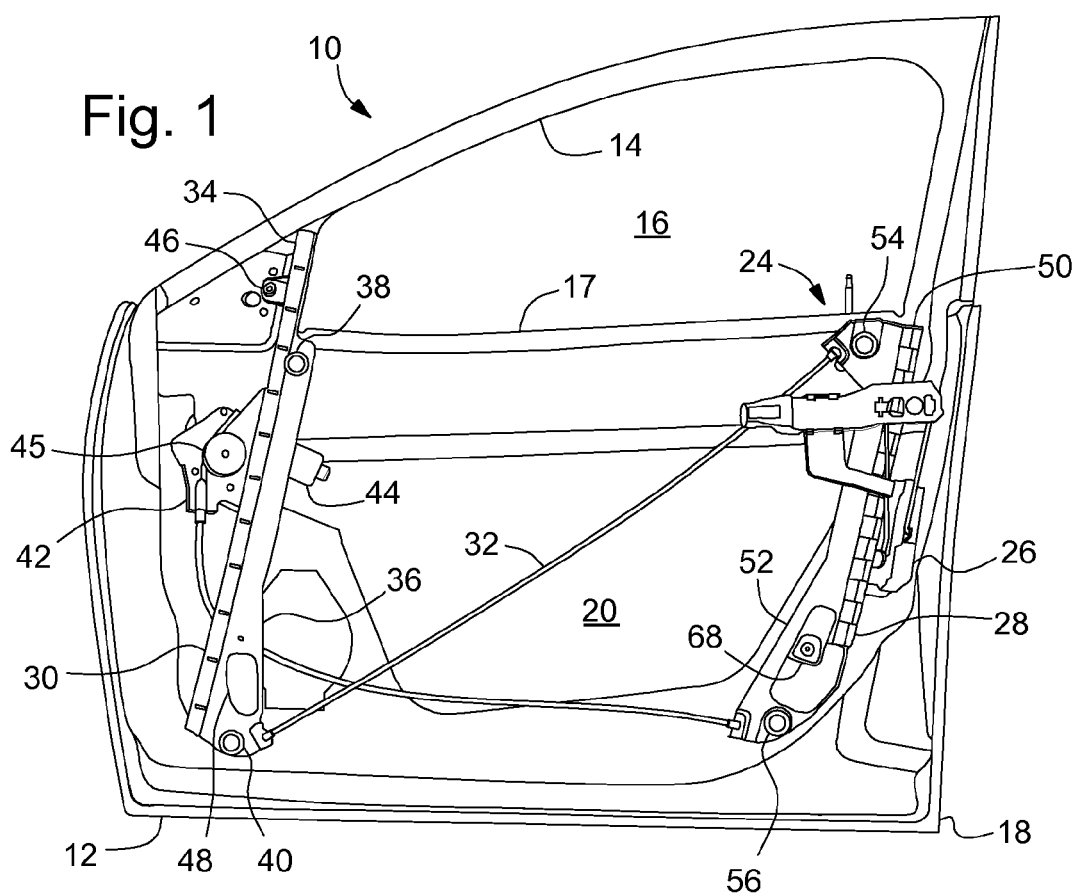
FIG. 1 is a side elevation view looking inboard at a portion of a vehicle door.

Referring now to FIG. 1, a portion of a vehicle door 10, having a door inner panel 12, is illustrated. The door inner panel 12 includes structure forming a window frame 14 that defines a window opening 16, the bottom edge 17 of which is generally referred to as a beltline, and other structure forming a lower door portion 18 that defines an access hole 20. The access hole 20 allows various components and sub-assemblies, such as a latch/window regulator module 24, to be assembled into the door 10.

The latch/window regulator module 24 is mounted to the door inner panel 12. The latch/window regulator module 24 includes a door latch assembly 26 mounted to a rear integrated channel/regulator 28, a forward integrated channel/regulator 30, and a window regulator cable assembly 32. The window regulator cable assembly 32 is mounted to and extends between the rear and forward integrated channel/regulators 28, 30.

The forward integrated channel/regulator 30 may include a forward glass run channel 34 that extends from and may be integral with a forward window regulator guide rail 36. The forward glass run channel 34 may extend somewhat above the beltline 17. A top front pulley 38 and a bottom front pulley 40 may mount to the forward guide rail 36. A motor flange 42 may extend from the forward integrated channel/regulator 30 and provide support for a motor 44 and cable drum 45. Upper and lower mounting flanges 46, 48, respectively, may provide locations for securing the forward integrated channel/regulator 30 to the door inner panel 12.

The term integral, as used herein, means that the particular elements are formed as a single monolithic piece rather than being formed separately and later assembled and secured together.

The rear integrated channel/regulator 28 may include a rear below belt glass run channel 50 that extends from and may be integral with a rear window regulator guide rail 52. A top rear pulley 54 and a bottom rear pulley 56 may mount to the guide rail 52. Also, a rear/lower door mounting flange 68 may extend from the rear integrated channel/regulator 28 and provide a location for securing the channel/regulator 28 to the door inner panel 12.

Figure 2:
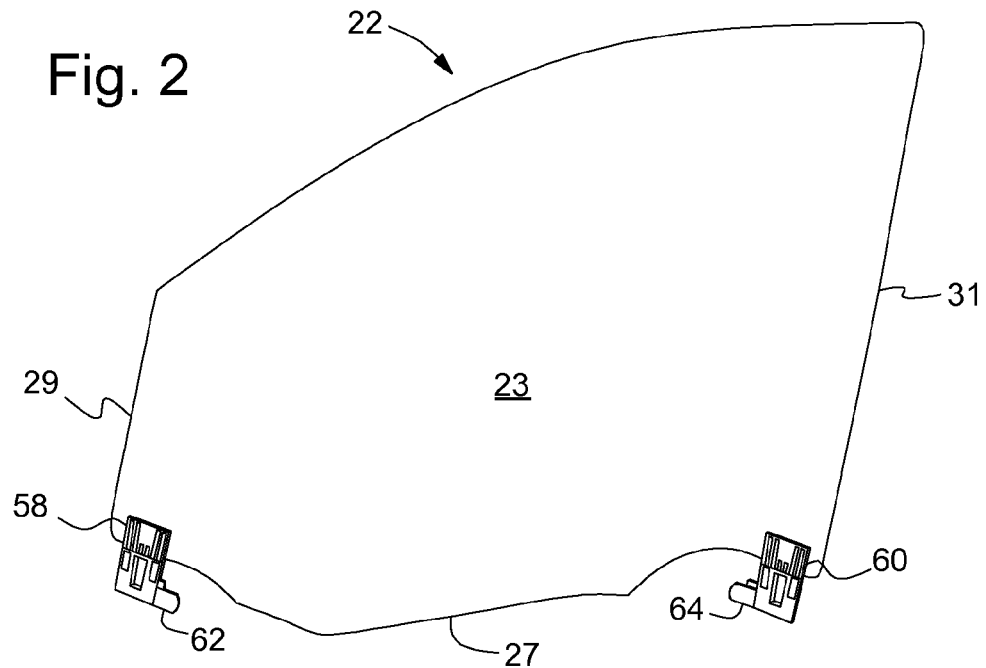
FIG. 2 is a side elevation view looking inboard at a window glass, glass clips and carriers.

FIG. 2 illustrates window glass 22 having an outboard surface 23, and inboard surface 25 (shown in FIG. 3), a bottom edge 27, a forward edge 29, and a rear edge 31. The window glass 22 is sized and shaped to fit into the door 10 (FIG. 1) and slide up an down to selectively cover the window opening 16 (FIG. 1). A forward glass clip 58 is mounted to the bottom edge 27 adjacent to the forward edge 29 of the glass 22, and a rear glass clip 60 is mounted to the bottom edge 27 adjacent to the rear edge 31 of the glass 22. A forward carrier 62 mounts to the forward glass clip 58 (discussed in more detail below) and a rear carrier 64 mounts to the rear glass clip 60.

FIGS. 3-5 illustrate the forward glass clip 58 and forward carrier 62 in more detail. Since the rear glass clip 60 and rear carrier 64 are preferably mirror images of the forward glass clip 58 and forward carrier 62, they are not shown in greater detail herein.

The forward glass clip 58 includes a main body 65 from which a pair of glass support flanges 66 extend. One each of the glass support flanges 66 is bonded to the outboard surface 23 and the inboard surface 25, respectively, of the glass 22. Alternatively, the glass support flanges 66 may be attached to the glass by a different method—for example being pressed-on, bolted-on via a through-hole in the glass, and snapped-on with a feature engaging a hole in the glass. The main body 65 also includes a catch hole 70, within which is mounted a cantilevered catch member 72. Extending from the catch member 72, adjacent to a free end 74, is a catch lip 76. A pair of cam engagement arms 78 extend from the main body 65, each including a cam engagement flange 80. The cam engagement arms 78 and cam engagement flanges 80 define a channel 82 within which the forward carrier 62 is received.

The forward carrier 62 includes a carrier body 84 from which a pair of cam guide shoulders 86 extend. The cam guide shoulders 86 extend farther from the carrier body 84 near an upper end 88 and taper toward the carrier body 84 near a lower end 90. The cam guide shoulders 86 are also spaced apart so they can slide in and be retained by the channel 82 of the forward glass clip 58. The carrier body 84 has a catch opening 92 that aligns with the free end 74 of the cantilevered catch member 72, allowing the catch lip 76 to engage an edge of the catch opening 92 when the forward carrier 62 is fully assembled to the forward glass clip 58. A cable retention flange 94 extends generally horizontally from the carrier body 84 and includes a ferrule pocket 96 and a cable take-up spring pocket 98. The term "generally horizontal", as used herein, means that the element extends in a direction that is horizontal or within about plus or minus thirty degrees from horizontal—as opposed to something that extends in a more vertical direction. Since the window glass 22 is raised and lowered generally vertically, a component extending generally horizontally would be oriented about normal to the direction of window movement. Generally vertically means that a component extends or moves vertically or within about plus or minus thirty degrees of vertical.

A first cable groove 100 and a second cable groove 102 are recessed in the carrier body 84 (best seen in FIG. 5). The first cable groove 100 is oriented generally horizontally at a first end adjacent to the cable take-up spring pocket 98 and curves upward about ninety degrees toward a second end that is oriented generally vertically. The second cable groove 102 is oriented generally horizontally at a first end adjacent to the ferrule pocket 96 and curves downward about ninety degrees toward a second end that is oriented generally vertically.

FIG. 5 shows portions of a first cable set 104 and a second cable set 106, both being part of the window regulator cable assembly 32. The first cable set 104 includes a first cable take-up spring 108 (shown schematically) attached at a first end, which is oriented generally horizontally in the cable take-up spring pocket 98. The first cable set 104 extends through the first cable groove 100, where it is redirected to a generally vertical orientation, around the top front pulley 38, where it is redirected to the cable drum 45 (shown in FIG. 1). From the cable drum 45, the first cable set 104 is directed down around the bottom rear pulley 56 (only the pulley, not the cable, shown in FIG. 1), where it is redirected up to a second end (not shown) at the rear carrier 64 (only the carrier, not the cable, shown in FIG. 2). The second end of the first cable set 104 is preferably attached to the rear carrier 64 the same way that a first end of the second cable set 106 is attached to the forward carrier 62, discussed below.

The second cable set 106 includes a ferrule 110, attached at a first end, that is mounted and retained in the ferrule pocket 96. The second cable set 106 extends through the second cable groove 102 where it is redirected to a generally vertical orientation, around the bottom front pulley 40 (only the pulley, not the cable, shown in FIG. 1), where it is redirected to the top rear pulley 54 (only the pulley, not the cable, shown in FIG. 1), and around the top rear pulley 54, where it is again redirected to the rear carrier 64 (only the carrier, not the cable, shown in FIG. 2) A second end of the second cable set 106 is preferably attached to the rear carrier 64 the same way that the first end of the first cable set 104 is attached (i.e., extending through a groove and attaching to a second cable take-up spring (not shown)).

Referring to FIGS. 1-5, pre-assembled components of the latch/window regulator module 24, then, may be inserted through the access hole 20 and secured to the door inner panel 12, rather than assembling the components after insertion into the door 10. The rear integrated channel/regulator 28 allows for pre-assembly of some components before assembly into the door 10. The forward integrated channel/regulator 30 also allows for pre-assembly of some components before assembly into the door 10. For example, the motor 44 and cable drum 45 may be mounted to the forward integrated channel/regulator 30 before installation. Also, the window regulator cable assembly 32 may be pre-assembled to the latch/window regulator module 24, with the forward and rear carrier 62, 64 and first and second cable sets 104, 106 pre-assembled before insertion of latch/window regulator module 24 into the door 10. All of these pre-assembled components of the latch/window regulator module 24, then, may be inserted through the access hole 20 and secured to the door inner panel 12. Consequently, far less of the assembly work for a vehicle assembler needs to be accomplished within the door itself. With these pre-assembled components mounted in the door, the window glass 22, having the forward and rear glass clips 58, 60 already attached, may be assembled into the door 10.

Figure 6:
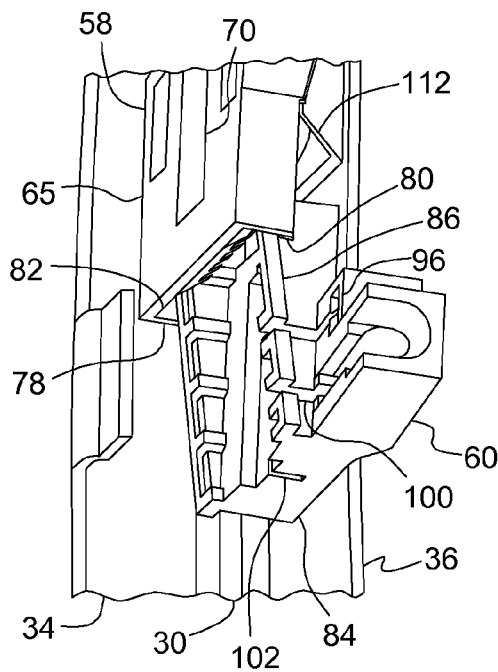
FIG. 6 is a perspective view of a portion of the forward integrated channel/regulator, and a portion of the forward glass clip as it is beginning to be assembled to the forward carrier.
Figure 7:
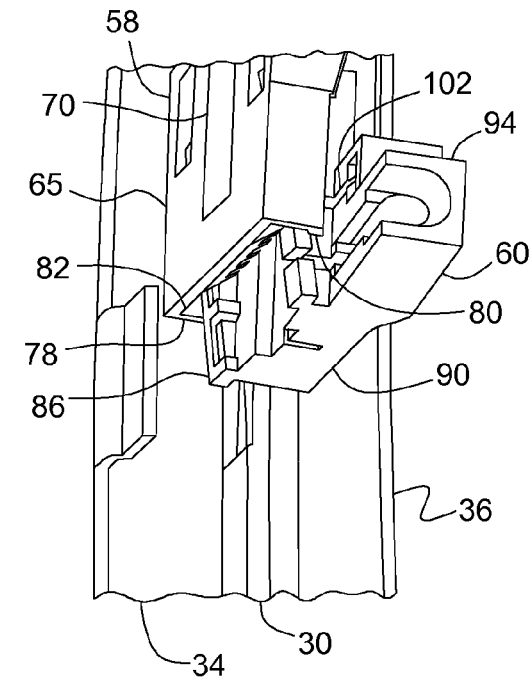
FIG. 7 is a view similar to FIG. 6, but illustrating the forward glass clip being partially assembled onto the forward carrier.
Figure 8:
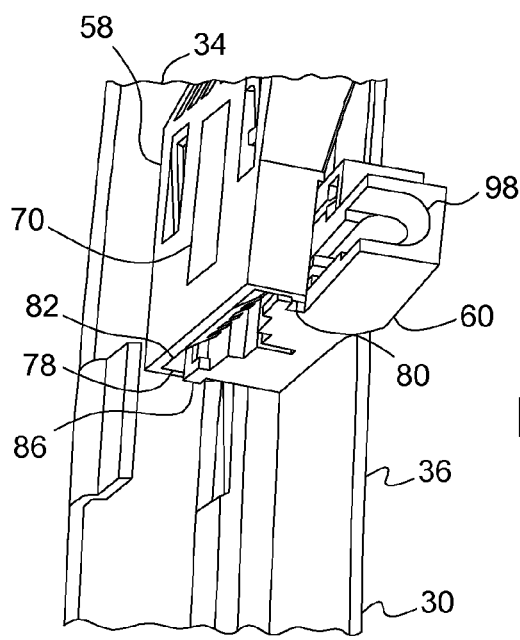
FIG. 8 is a view similar to FIG. 6, but illustrating the forward glass clip fully assembled onto the forward carrier.

FIGS. 6-8 illustrate the installation of the glass clips 58, 60, and hence the window glass 22 (shown in FIGS. 2-5) onto the carriers 62, 64 (only the forward glass clip 58 and forward carrier 62 shown). The rear glass clip 60 and rear carrier 64 (shown in FIG. 2) preferably install in the same way and so are not shown separately. The first and second cable sets 104, 106 are not shown in these views, but would be installed and support the carriers 62, 64 prior to installation of the window glass clips 58, 60 (shown in FIG. 2). Initially, prior to the installation of the window glass 22, the first and second cable sets 104, 106 hold the forward and rear carriers 62, 64 in surface contact with the forward and rear window regulator guide rails 36, 52, a shipping position. It is the cable sets 104, 106 themselves that position the carriers 62, 64—so they are free floating. That is, unlike conventional window regulator guide rails where the carrier plates are secured to and slide along a vertically extending flange (thus the motion being defined by the flange), these carriers are secured to and guided by the cable sets 104, 106.

In FIG. 6, as the window glass 22 (see FIG. 2) is inserted, the forward glass clip 58 is held outboard off of the surface of the forward window regulator guide rail 36 by a spacer 112, aligning the channel 82 with the cam guide shoulders 86 at the upper end of the forward carrier 62. The cam guide shoulders 86, extending out farther from the carrier body 84, allow for the alignment, even though the forward carrier 62 is off to one side of the forward glass run channel 34 against the forward window regulator guide rail 36. As seen in FIG. 7, the forward carrier 62 is moved upward into the forward glass clip 58. As this occurs, the cam guide shoulders slide farther into the channel 82, causing the forward carrier 62 to be pulled outboard off of the forward window regulator guide rail 36 toward the center of the forward glass run channel 34. The forward carrier 62 is moved upward farther until the forward glass clip 58 is fully seated on the forward carrier 62 and the forward carrier 62 is cammed further into the middle of the forward glass run channel 34, as seen in FIG. 8. At this point, the free end 74 of the cantilevered catch member 72 (shown in FIG. 3) overlaps with the catch opening 92 (FIG. 3) such that the catch lip 76 (FIG. 3) snaps over and engages an edge of the catch opening 92. The forward glass clip 58 and forward carrier 62 are now secured together. The self-locating of the carrier 62 relative to the glass clip 58 as they initially contact each other and then cam into the use position, as well as the snap-securing of the glass clip 58 to the carrier 62, in particular, allow for this type of assembly. This arrangement is particularly advantageous when the glass run channels are integral with the guide rails in the latch/window regulator module 24.

Once installed, the latch/window regulator module 24, employing the rear and forward integrated channel regulators 28, 30, both guides the window glass 22 and controls its up and down motion. The rear and forward integrated channel/regulators 28, 30 guide the window glass 22 both inboard/outboard as well as fore/aft. The pulleys 38, 40, 54, 56 cooperate with the window regulator cable assembly 32 to guide the cable sets 104, 106, while the motor 44 and cable drum 45 control the up and down movement of the window glass 22.

While certain embodiments of the present invention have been described in detail, those familiar with the art to which this invention relates will recognize various alternative designs and embodiments for practicing the invention as defined by the following claims.

What is claimed is:

1. A glass clip and carrier assembly for use in supporting a movable window glass in a vehicle door, the assembly comprising:
    a glass clip including a glass support flange engageable with the window glass, a clip body extending from the glass support flange, and a pair of cam engagement arms extending from the clip body, each of the cam engagement arms including a cam engagement flange extending therefrom to define a channel; and
    a carrier including a carrier body operatively engageable with a first cable set, and a pair of camming guide shoulders extending from the carrier body and slidably received in the channel, the camming guide shoulders extending farther from the carrier body at a first end adjacent to the glass support flange and tapering toward the carrier body as the camming guide shoulders extend away from the first end, whereby the carrier body is pulled closer to the clip body as the camming guide shoulders are slid further into the channel;
    wherein the carrier has a cable retention flange extending from the carrier body in a generally horizontal direction and including a cable take-up spring pocket, and wherein a cable take-up spring is mounted in the cable take-up spring pocket and extends in the generally horizontal direction; and
    wherein the carrier body includes a first cable groove recessed therein and adapted to receive a portion of the first cable set, the first cable groove having a first end extending in the generally horizontal direction into the cable take-up spring pocket and a second end extending in a generally vertical direction.

2. The assembly of claim 1 wherein the cable retention flange includes a ferrule pocket and the carrier body includes a second cable groove recessed therein and adapted to receive a portion of a second cable set, the second cable groove having a first end extending in the generally horizontal direction into the ferrule pocket and a second end extending in the generally vertical direction.

3. The assembly of claim 1 wherein the carrier includes a catch opening and the glass clip includes a cantilevered catch extending from the clip body and including a free end and a catch lip adjacent to the free end, the catch lip operatively engaging the catch opening to secure the carrier to the glass clip.

4. A window glass support assembly for use in supporting a movable window glass in a vehicle door, the assembly comprising:
- a glass clip including a glass support flange engageable with the window glass, a clip body extending from the glass support flange, and a pair of engagement arms extending from the clip body, each of the engagement arms including an engagement flange extending therefrom to define a channel;
- a carrier including a carrier body having a pair of guide shoulders extending from the carrier body and slidably received in the channel, a first cable groove recessed in the carrier body and including a first end extending in a generally horizontal direction and a second end extending in a generally vertical direction, and a second cable groove recessed in the carrier body and including a first end and a second end;
- a first cable set mounted in the first cable groove and supporting the carrier; and
- a second cable set mounted in the second cable groove and supporting the carrier.

5. The assembly of claim 4 including a second glass clip, spaced from the glass clip, including a second glass support flange engageable with the window glass, a second clip body extending from the second glass support flange, and a second pair of engagement arms extending from the second clip body, each of the second engagement arms including a second engagement flange extending therefrom to define a second channel; and a second carrier including a second carrier body having a second pair of guide shoulders extending from the second carrier body and slidably received in the second channel, a third cable groove recessed in the second carrier body and including a first end extending in a generally horizontal direction and a second end extending in a generally vertical direction, and a fourth cable groove recessed in the second carrier body and including a first end and a second end; and the first cable set mounted in the fourth cable groove and supporting the second carrier, and the second cable set mounted in the third cable groove and supporting the second carrier.

6. The assembly of claim 5 wherein the guide shoulders of the carrier extend farther from the carrier body at a first end adjacent to the glass support flange and tapering toward the carrier body as the guide shoulders extend away from the first end, whereby the carrier body is pulled closer to the clip body as the guide shoulders are slid further into the channel.

7. The assembly of claim 5 including a forward window regulator guide rail, a rear window regulator guide rail, spaced from the front window regulator guide rail, a top front pulley mounted on the forward window regulator guide rail operatively engaging the first cable set, a bottom front pulley mounted on the forward window regulator guide rail opera-tively engaging the second cable set, a top rear pulley mounted on the rear window regulator guide rail operatively engaging the second cable set, and a bottom rear pulley mounted on the rear window regulator guide rail operatively engaging the first cable set.

8. The assembly of claim 4 wherein the glass support flange includes a pair of flanges securable to opposed surfaces of the window glass.

9. The assembly of claim 4 wherein the carrier has a cable retention flange extending from the carrier body in a generally horizontal direction and including a cable take-up spring pocket, and wherein the assembly includes a cable take-up spring mounted in the cable take-up spring pocket and extending in a generally horizontal direction, the cable take-up spring operatively engaging the first cable set.

10. The assembly of claim 4 wherein the carrier includes a catch opening and the glass clip includes a cantilevered catch extending from the clip body and including a free end and a catch lip adjacent to the free end, the catch lip operatively engaging the catch opening to secure the carrier to the glass clip.

11. The assembly of claim 4 including a forward window regulator guide rail, a top front pulley mounted on the forward window regulator guide rail operatively engaging the first cable set, and a bottom front pulley mounted on the forward window regulator guide rail operatively engaging the second cable set.

12. A method of assembling a movable window glass into a vehicle door comprising the steps of:
- (a) affixing a glass clip under a bottom edge of the window glass;
- (b) supporting a carrier in a location in the vehicle door by securing the carrier to a first cable set and a second cable set;
- (c) sliding the glass clip and the window glass into the vehicle door;
- (d) sliding a first end of a pair of camming guide shoulders of the carrier into a channel in the glass clip, with the first end of the camming guide shoulders extending a first distance from a carrier body and tapering toward a second end that is a second distance from the carrier body, the second distance being less than the first distance;
- (e) sliding the camming guide shoulders into the channel, thereby camming the carrier body closer to a clip body against a bias of the first cable set and the second cable set; and
- (f) securing the glass clip to the carrier.

13. The method of claim 12 wherein step (a) is further defined by the glass clip having a pair of glass support flanges and the glass support flanges each being bonded to an opposed surface of the window glass.

14. The method of claim 12 wherein step (f) is further defined by the carrier having a catch opening, the glass clip having cantilevered catch including a free end and a catch lip adjacent to the free end, and the catch lip engaging the catch opening to secure the glass clip to the carrier.

15. The method of claim 12 wherein step (b) is further defined by the carrier including a cable take-up spring mounted to the carrier and attached to the first cable set, the first cable set extending through a first cable groove recessed in the carrier to thereby support the carrier with the first cable set.

* * * * *